(12) United States Patent
Christensen (10) Patent No.: US 10,513,147 B1
(45) Date of Patent: Dec. 24, 2019

(54) WHEEL LOCK BOLT REMOVAL TOOL AND METHOD OF USE

(71) Applicant: AGA Tools & Products, Inc., Escondido, CA (US)

(72) Inventor: Hans Martin Christensen, Escondido, CA (US)

(73) Assignee: AGA Tools & Products, Inc., Escondido, CA (US)

( * ) Notice: Subject to any disclaimer, the term of this patent is extended or adjusted under 35 U.S.C. 154(b) by 141 days.

(21) Appl. No.: 15/676,229

(22) Filed: Aug. 14, 2017

Related U.S. Application Data (60) Provisional application No. 62/378,187, filed on Aug. 22, 2016.

(51) Int. Cl.
*B60B 29/00* (2006.01)
*B25D 1/16* (2006.01)
*B25G 1/00* (2006.01)
*B60B 27/06* (2006.01)

(52) U.S. Cl.
CPC .............. *B60B 29/003* (2013.01); *B25D 1/16* (2013.01); *B25G 1/005* (2013.01); *B60B 27/065* (2013.01); *B60B 2340/52* (2013.01); *B60B 2900/3318* (2013.01)

(58) Field of Classification Search
CPC . B60B 29/003; B60B 2900/3318; B25D 1/16; B25B 13/485
USPC ............................................ 81/114; 411/910
See application file for complete search history.

(56) References Cited

U.S. PATENT DOCUMENTS

| | | | | |
|---|---|---|---|---|
| 680,560 A * | 8/1901 | Barnes | ..................... | B25B 13/48 81/459 |
| 1,690,018 A * | 10/1928 | Kerfoot | ..................... | B25B 13/44 81/114 |
| 1,815,500 A * | 7/1931 | Doan | ..................... | B25B 23/103 81/53.2 |
| 2,050,005 A * | 8/1936 | Heegeman | ............. | B25B 27/062 29/263 |
| 2,550,866 A * | 5/1951 | Rosan | ..................... | B25B 13/48 81/53.2 |
| 2,562,419 A * | 7/1951 | Ferris | ...................... | B25B 31/00 29/243.519 |
| 2,951,406 A * | 9/1960 | Brase | ...................... | B25B 27/18 81/459 |
| 3,330,177 A * | 7/1967 | Oliver | ................... | B25B 13/065 411/424 |

(Continued)

Primary Examiner — Jacob J Cigna
Assistant Examiner — Michael W Hotchkiss
(74) Attorney, Agent, or Firm — Lodestone Legal Group; Jeromye V. Sartain (57) ABSTRACT

A wheel lock bolt removal tool apparatus for removing a wheel lock from a vehicle wheel, the wheel lock having a wheel lock bolt with a spinning ring, the apparatus comprising an extractor comprising a collet and a sleeve received substantially coaxially over the collet, the collet body having a distal opening formed having a radially-inwardly-projecting distal lip, the distal opening and distal lip configured to pass over and seat on the spinning ring of the wheel lock as by engaging the lip on a distal edge of the spinning ring, the collet body configured to be selectively closed upon distal movement of the sleeve along the collet and further having a proximal end configured for application of an axial proximally-directed force in removing the spinning ring from the wheel lock bolt.

21 Claims, 7 Drawing Sheets

(56) References Cited

U.S. PATENT DOCUMENTS

| | | | | |
|---|---|---|---|---|
| 3,416,395 | A * | 12/1968 | Hanson | B25B 23/065 81/125 |
| 3,424,212 | A * | 1/1969 | Kemper | B25B 15/007 81/436 |
| 3,519,979 | A * | 7/1970 | Bodenstein | F16B 41/005 439/133 |
| 3,735,650 | A * | 5/1973 | Weng, Jr. | B25B 27/18 81/53.2 |
| 4,037,515 | A * | 7/1977 | Kesselman | F16B 41/005 411/3 |
| 4,385,534 | A * | 5/1983 | Nichols | B25B 13/44 81/114 |
| 4,466,314 | A * | 8/1984 | Rich | B25B 13/486 81/177.85 |
| 4,521,146 | A * | 6/1985 | Wharton | F16B 41/005 411/1 |
| 4,645,397 | A * | 2/1987 | Howe | F16B 41/005 411/372.6 |
| 4,724,608 | A * | 2/1988 | Parrott | B25B 27/023 29/253 |
| 4,726,723 | A * | 2/1988 | Bainbridge | F16B 23/0007 411/432 |
| 4,742,702 | A * | 5/1988 | Swertz | F16B 23/0069 411/910 |
| 5,449,260 | A * | 9/1995 | Whittle | F16B 23/0007 411/377 |
| 5,546,834 | A * | 8/1996 | Gable | B25B 13/48 81/53.2 |
| 5,664,467 | A * | 9/1997 | Breeze | B25B 13/065 81/114 |
| 6,036,419 | A * | 3/2000 | Lanham | F16B 23/0061 301/35.621 |
| 6,719,511 | B2 * | 4/2004 | Notaro | F16B 23/0007 411/372.6 |
| 6,736,579 | B2 * | 5/2004 | Lonnqvist | B25B 13/485 411/396 |
| 8,888,430 | B2 * | 11/2014 | Groppo | F16B 41/005 411/403 |
| 9,200,666 | B1 * | 12/2015 | Cadena | F16B 41/005 |
| 9,429,181 | B2 * | 8/2016 | Cadena | F16B 39/28 |
| 2005/0247169 | A1 * | 11/2005 | Faries, Jr. | B25B 13/485 81/176.15 |
| 2006/0016298 | A1 * | 1/2006 | Chang | B25B 13/005 81/177.5 |
| 2008/0044254 | A1 * | 2/2008 | Wilson | F16B 23/0007 411/429 |
| 2009/0255384 | A1 * | 10/2009 | Whitehead | B25B 27/0035 81/459 |
| 2010/0064863 | A1 * | 3/2010 | Kozak | B25B 13/485 81/451 |
| 2013/0180369 | A1 * | 7/2013 | Dolan | B25B 23/0085 81/461 |
| 2017/0363129 | A1 * | 12/2017 | Bada | B25B 13/065 |

\* cited by examiner

WHEEL LOCK BOLT REMOVAL TOOL AND METHOD OF USE

RELATED APPLICATIONS

This non-provisional patent application claims priority pursuant to 35 U.S.C. § 119(e) to and is entitled to the filing date of U.S. Provisional Patent Application Ser. No. 62/378,187 filed Aug. 22, 2016, and entitled "Wheel Lock Bolt Removal Tool and Method of Use." The contents of the aforementioned application is incorporated herein by reference.

BACKGROUND

The subject of this provisional patent application relates generally to automotive tools, and more particularly to wheel lock bolt removal tools configured for removing a high-security wheel lock bolt with spinning ring from a vehicle wheel.

The following description includes information that may be useful in understanding the present invention. It is not an admission that any of the information provided herein is prior art or relevant to the presently claimed invention, or that any publication specifically or implicitly referenced is prior art.

Applicant hereby incorporates herein by reference any and all patents and published patent applications cited or referred to in this application, to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

By way of background, on many high end automobiles such as BMW, Mercedes-Benz, Audi, Porsche, and other makes and models, the wheels, or sometimes referred to as "rims," are installed on the vehicle using high security wheel lock bolts having spinning rings, which can only be loosened or removed with a particular keyed wheel lock socket. Often, over time the wheel lock is stuck or cannot be loosened or removed because its driving or mating surfaces have been stripped or rounded or the keyed wheel lock socket is broken or missing. As such, some other means for removal is required in order to ultimately be able to remove the wheel for a variety of maintenance or repair tasks on the automobile.

Presently, in the art there is not a convenient or effective way to loosen or remove stuck wheel lock bolts. Some types of wheel lock bolts can have an aggressive grabbing socket pounded on the bolt head, which can then be broken loose with a breaker bar, but not so with high security wheel lock bolts with spinning rings. Instead, resort has been had to such measures as welding a large blob of metal on the bolt head on which a socket could then be pounded for removal or grinding away the spinning ring and portions of the bolt head and then pounding on a socket for breaking the bolt loose, often leading to damage to the wheel requiring refinishing or even replacement. As such, removal of the stuck wheel lock bolt and then the wheel can be a very difficult and time consuming job and often even very expensive when damage to the wheel is caused in the process. Thus, what is still needed and has heretofore been unavailable is a means for relatively quickly and easily removing even stripped or damaged high security wheel lock bolts with spinning rings without the need of a key and without damage to the wheel.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a wheel lock bolt removal tool. In at least one embodiment, the wheel lock bolt removal tool generally comprises an extractor having a collet configured to engage the spinning ring of a high security wheel lock bolt and further having a sleeve engaged on the collet so as to selectively clamp the collet onto the ring of the wheel lock bolt, the tool further comprising a driver for engaging the spline of the wheel lock bolt once the wheel lock ring and pad are removed through the use of the extractor.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of an apparatus according to aspects of the present invention and its components or features unless specifically set forth herein.

DETAILED DESCRIPTION

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the inventive subject matter is susceptible of various modifications and alternative embodiments, certain illustrated embodiments thereof are shown in the drawings and will be described below in detail. It should be understood, however, that there is no intention to limit the invention to any specific form disclosed, but on the contrary, the inventive subject matter is to cover all modifications, alternative embodiments, and equivalents falling within the scope of the claims.

Figure 1:
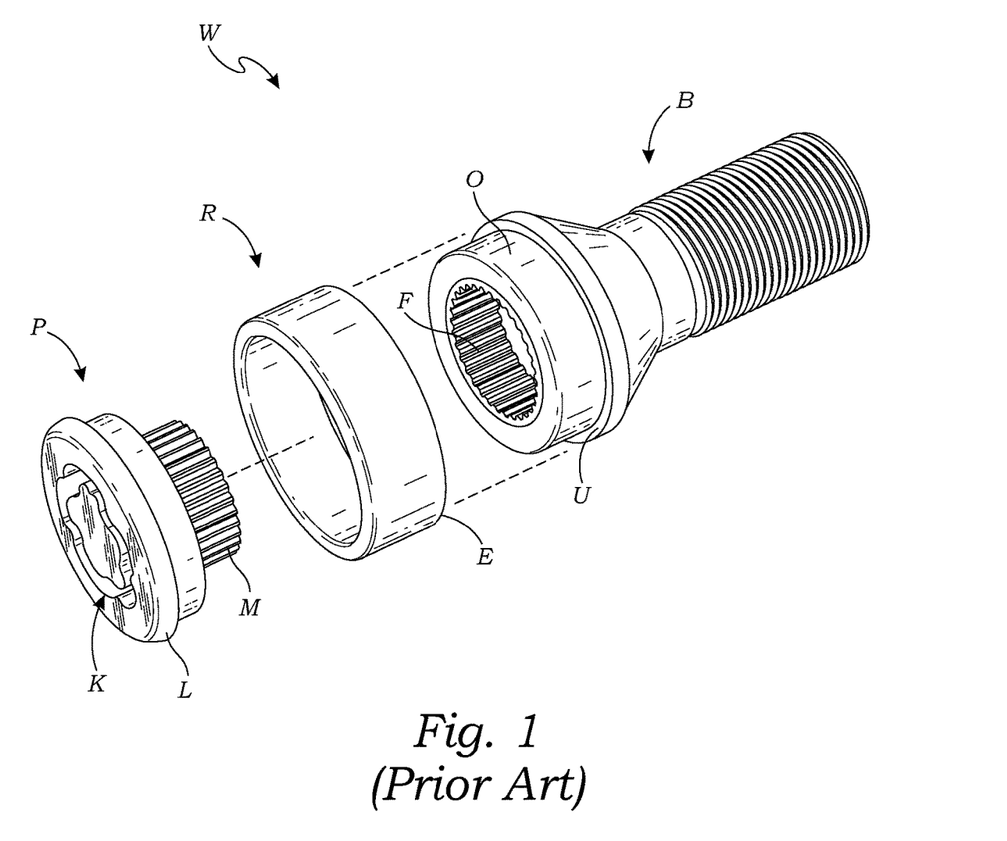
FIG. 1 is an enlarged exploded perspective view of an exemplary prior art wheel lock bolt with spinning ring.

Turning initially to FIG. 1, for context and further background, there is shown an enlarged exploded perspective view of an exemplary prior art wheel lock W comprising a wheel lock bolt B having a spinning ring R retained on the bolt B with a wheel lock pad P that seats over the ring R as by inserting the external male spline M of the pad P into the internal female spline F of the bolt B. When assembled, the wheel lock W may thus only be engaged and rotated via engagement of a special keyed wheel lock socket (not shown) with the key K of the wheel lock pad P, which again is itself axially and rotationally engaged with the bolt B through the engagement of the respective male and female splines M, F. It will be appreciated that the ring R would simply spin about the smooth outside surface O of the proximal end of the bolt B as held in place axially distally by the shoulder U of the bolt B and proximally by the radial flange L of the wheel lock pad P and thus any attempt to engage the ring R as by pounding onto it a grabbing socket would only result in rotating the ring R about the bolt B but not rotating the bolt B at all, hence the need for some way to engage the bolt B itself even when the key K is compromised or otherwise of no avail, again preferably in a convenient and effective manner that also reduces the risk of damage to the surrounding vehicle wheel I (FIGS. 15 and 16) in the process.

Figure 2:
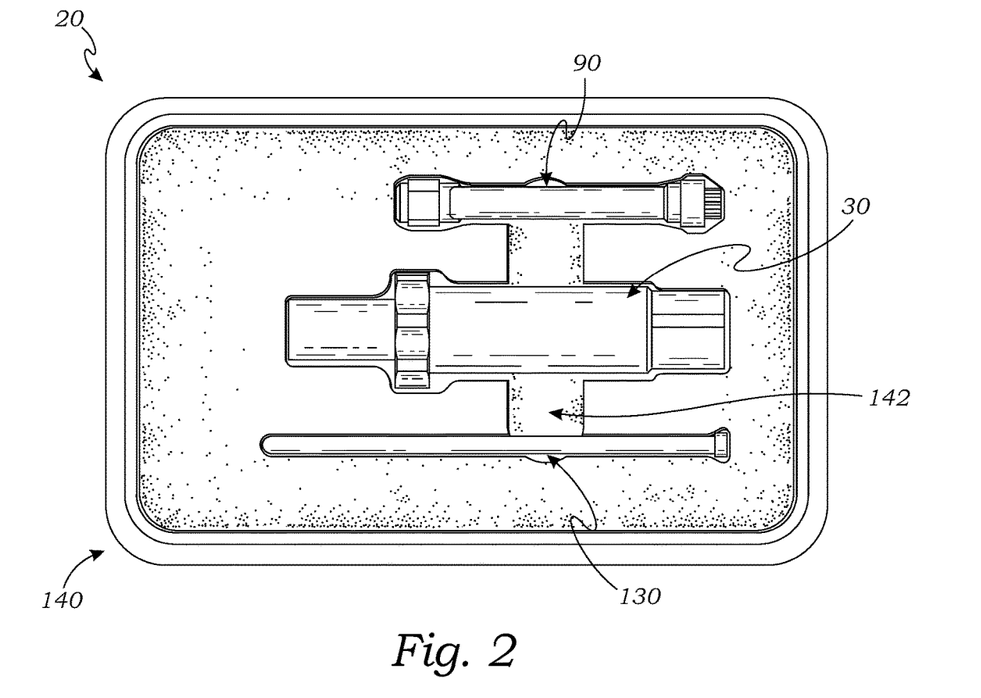
FIG. 2 is a perspective view of an exemplary wheel lock bolt removal tool in the form of a kit, in accordance with at least one embodiment.

Referring first to FIG. 2, there is shown a perspective view of an exemplary wheel lock bolt removal tool 20 in the form of a kit. The wheel lock bolt removal tool 20 generally comprises, in the exemplary embodiment, an extractor 30, a driver 90, and a pin 130, more about each of which is said below in terms of construction and use. As shown, when configured as a kit, the tool 20 may be packaged within a case 140 having recesses 142 for receipt of the individual components of the tool 20 as appropriate, here the extractor 30, driver 90, and pin 130. As a threshold matter, those skilled in the art will appreciate that a wheel lock bolt removal tool 20 according to aspects of the present invention may comprise components of various configurations and combinations and so may entail a variety of packaging cases or the like, all without departing from the spirit and scope of the invention, such that the components 30, 90, 130 and case 140 shown and described are to be understood as merely illustrative and non-limiting. More generally, those skilled in the art will appreciate that the drawings are schematic in nature and are not to be taken literally or to scale in terms of material configurations, sizes, thicknesses, and other attributes of the wheel lock bolt removal tool 20 and its components or features unless specifically set forth herein.

Figure 3:
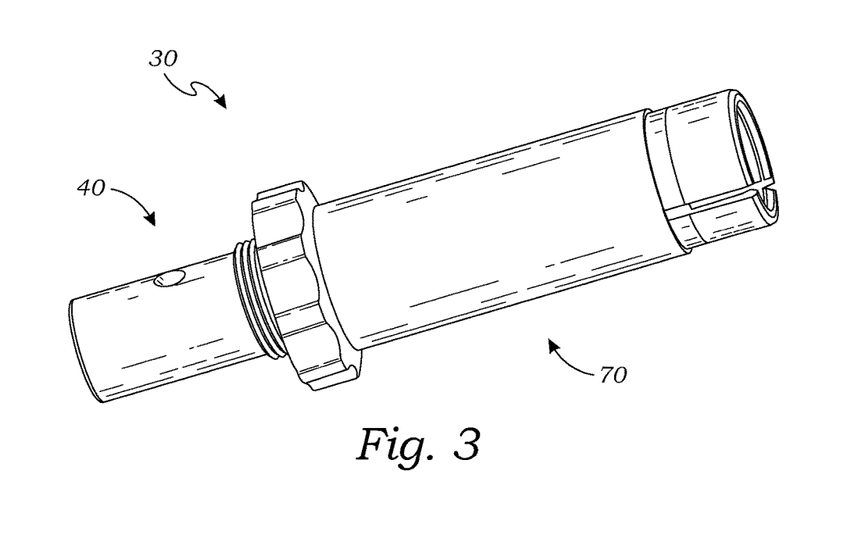
FIG. 3 is an enlarged perspective view of an exemplary extractor thereof, in accordance with at least one embodiment.

Turning briefly to FIG. 3, there is shown an enlarged perspective view of an exemplary extractor 30 of the wheel lock bolt removal tool 20 according to aspects of the present invention such as shown in FIG. 2. As shown, the extractor 30 itself is an assembly generally comprising a collet 40 and a sleeve 70 received substantially coaxially over the collet 40. In the exemplary embodiment, the collet 40 and sleeve 70 are threadably engaged, though it will be appreciated that other means of engagement and interoperability now known or later developed are possible without departing from the spirit and scope of the invention.

Figure 4:
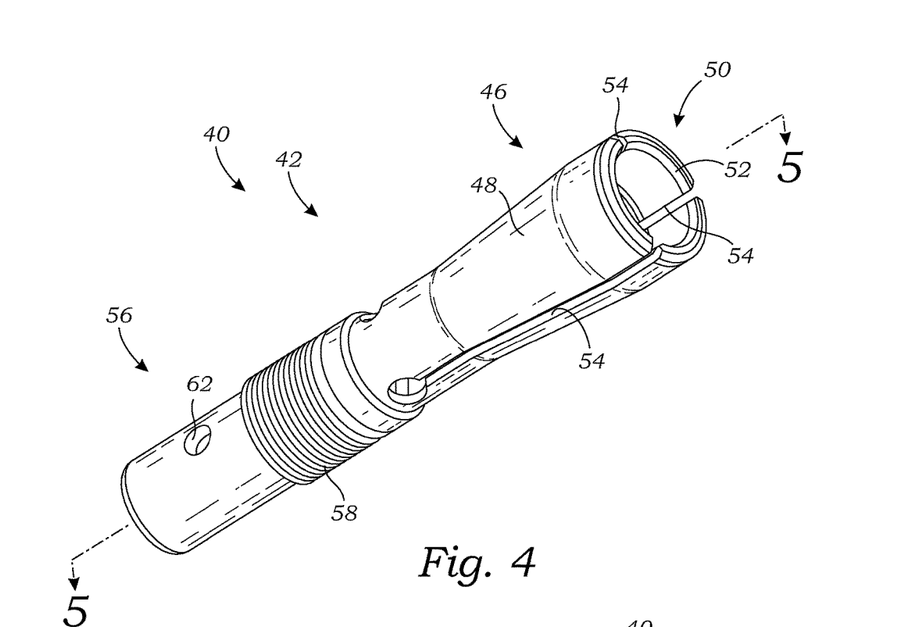
FIG. 4 is a perspective view of an exemplary collet of the extractor of FIG. 3, in accordance with at least one embodiment.
Figure 5:
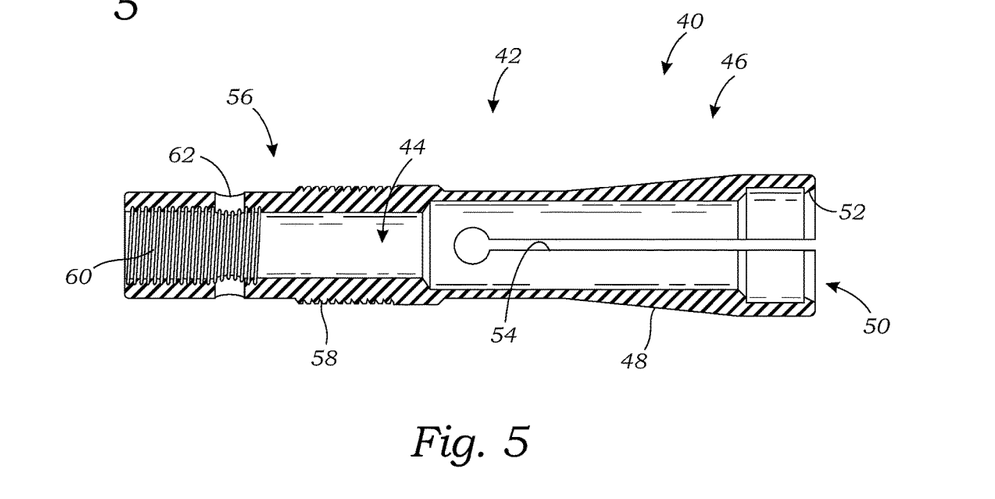
FIG. 5 is a cross-sectional view thereof taken along line 5-5 of FIG. 4, in accordance with at least one embodiment.

Referring then to FIGS. 4 and 5, there are shown perspective and cross-sectional views of an exemplary collet 40 of the extractor 30 of FIG. 3. As shown, the collet 40 comprises a lengthwise collet body 42 having a central bore 44 therethrough. At the distal end 46 of the collet body 42 there is formed a distally outwardly tapering surface 48. Internally, the central bore 44 terminates distally in a distal opening 50 formed having a radially-inwardly-projecting distal lip 52, the opening 50 and lip 52 being sized and configured to pass over and seat on the spinning ring R of the wheel lock W (FIG. 1), particularly as by engaging the lip 52 on the distal or back edge E of the ring R, more about which is said further below in connection with a description of the exemplary use of a wheel lock bolt removal tool 20 according to aspects of the present invention. At and axially along the distal end 46 of the collet body 42 there are formed two or more spaced apart lengthwise slots 54, which it will be appreciated allow the distal end 46 of the collet body 42 to flex inwardly and thus the distal opening 50 to close or be reduced in size, more about which is again explained below. In the exemplary embodiment, three such slots 54 are shown, though again it will be appreciated that such is illustrative and non-limiting. At the opposite proximal end 56 of the collet body 42 there are formed intermediate outer threads 58 proximal of the slots 54 and inner threads 60 proximal of the outer threads 58 in a stepped down portion of the proximal end of the central bore 44, the outer threads 58 being configured for selective engagement of the sleeve 70 on the collet 40 to form the extractor 30 and the inner threads 60 being configured for selective engagement by a further tool such as a slide hammer H (FIG. 15), once again more about which is said further below. Finally, a cross-hole 62 is formed in the proximal end 56 of the collet body 42 somewhat in the vicinity of the inner threads 60, once again, more about which is said below in connection with use of the wheel lock bolt removal tool 20, preferably intersecting opposite sides of the body 42 across the bore 44 so as to form a through-hole in the body 42, though not necessarily so. In the exemplary embodiment shown, the extractor collet 40 may be formed of a heat treated steel material as by first being machined from a stock material having a nominal outside diameter of on the order of one to one-and-a-half inches (1.0-1.5 in.), with the resulting collet 40 having an overall length of approximately five-and-a-half to six inches (5.5-6.0 in.), though again, those skilled in the art will appreciate that other sizes and configurations and materials and methods of construction now known or later developed may be employed. Similarly, by way of further illustration and not limitation, the collet central bore 44 may be of constant diameter or stepped or tapered and may have a nominal inside diameter in the range of one-half inch to one-and-a-quarter inches (0.5-1.25 in.).

Figure 6:
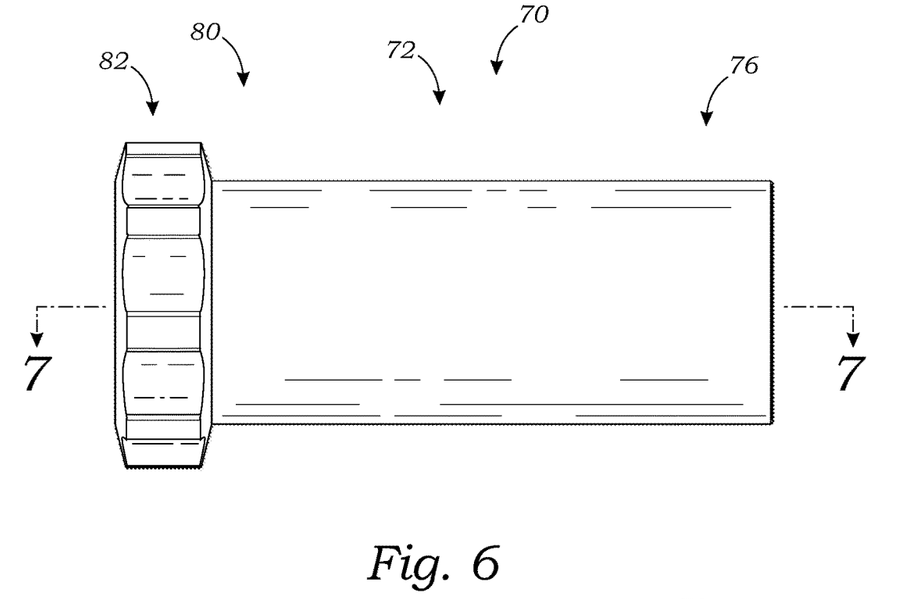
FIG. 6 is an enlarged side view of an exemplary sleeve of the extractor of FIG. 3, in accordance with at least one embodiment.
Figure 7:
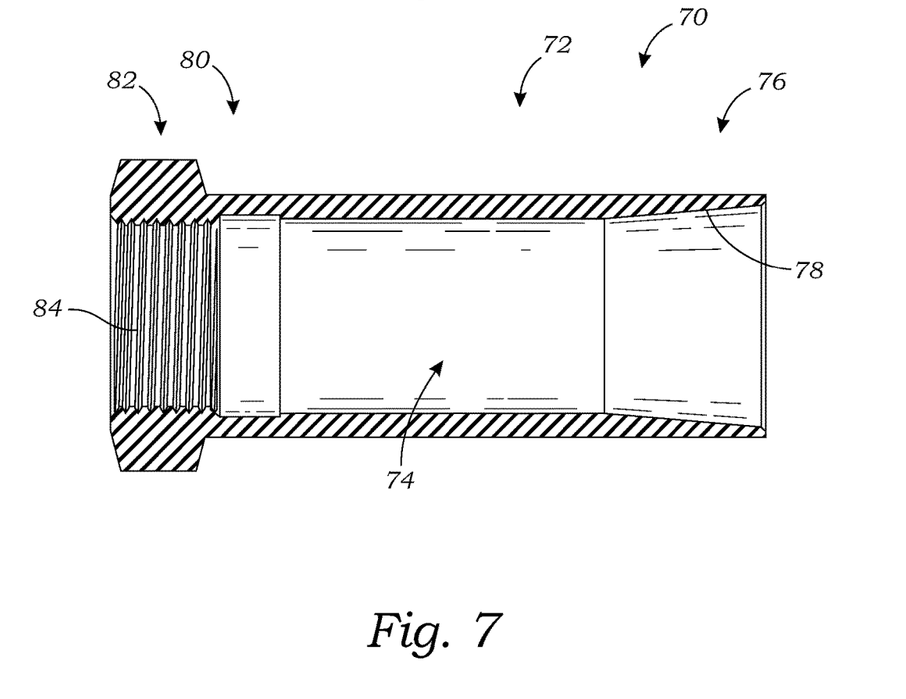
FIG. 7 is a cross-sectional view thereof taken along line 7-7 of FIG. 6, in accordance with at least one embodiment.

Turning next to FIGS. 6 and 7, there are now shown perspective and cross-sectional views of an exemplary sleeve 70 of the extractor 30 of FIG. 3 as may be configured to axially and threadably engage the exemplary collet 40 of FIGS. 4 and 5. Here, the sleeve 70 is shown as generally comprising a sleeve body 72 having a lengthwise central bore 74 therethrough and communicating between the opposite distal and proximal ends 76, 80. Here, the inner bore 74 is formed having a distally outwardly tapering inner surface 78, at least at the distal end 76 thereof. Proximally, the inner bore 74 is formed having inner threads 84 configured to engage the outer threads 58 of the collet 40 (FIGS. 4 and 5). Notably, those skilled in the art will appreciate that by sliding the sleeve 70 onto the collet 40 as by passing the distal end 76 of the sleeve 70 over the proximal end 56 of the collet 40 until the inner threads 84 of the sleeve 70 contact the outer threads 58 of the collet 40, then further rotating the sleeve 70 relative to the collet 40 will selectively engage the threads 58, 84 such that continued rotation and engagement causes the sleeve 70 to further travel distally along the collet 40. Accordingly, upon such threadable engagement of the sleeve 70 and collet 40 and relative rotation it will be appreciated that the distal outer tapered surface 48 of the collet 40 will be engaged by the distal inner tapered surface 78 of the sleeve 70 thereby creating a mechanical ramp effect. It will be further appreciated that further rotation of the sleeve 70 relative to the collet 40 will cause the sleeve's distal inner tapered surface 78 to ride further along the collet's distal outer tapered surface 48, thereby causing the distal end 46 of the collet body 42 to be radially compressed or squeezed as allowed by the two or more lengthwise slots 54, thus reducing the size of the distal opening 50 of the collet central bore 44 and shifting the distal lip 52 into a relatively smaller size or diameter. To assist with grasping and rotating the sleeve 70 relative to the collet 40, the sleeve body 72 may be formed with an outer knob 82 or any other such gripping feature now known or later developed; in the exemplary embodiment, such knob 82 is formed at the proximal end 80 of the sleeve body 72, though again not necessarily so. Those skilled in the art will thus appreciate that as the sleeve 70 is threaded distally further and further onto the collet 40, the collet 40, and particularly its distal end 46, is squeezed down more and more so as to effectively clamp around any structure previously positioned within the collet central bore 44, with the distal lip 52 further securing such clamping or engagement as by effectively hooking about an edge or other feature of the structure clamped within the collet 40. In the exemplary context of the wheel lock bolt removal tool 20, it will again be appreciated that such clamped structure may be the ring R of the wheel lock W (FIG. 1), such that once the collet 40 is clamped onto the ring R, preferably with the distal lip 52 positioned and hooked behind the distal edge E of the ring R, an axial force exerted proximally would pull the ring R and pad P out of the wheel lock bolt B as by disengaging the pad's male spline M from the female spline F of the bolt B (FIG. 1), more about which is again said below in describing the wheel lock bolt removal tool 20 in use. In the exemplary embodiment, the sleeve 70 may also be formed of a heat treated steel material as by first being machined from a stock material having a nominal outside diameter of on the order of one-and-a-half to two inches (1.5-2.0 in.), with the resulting sleeve 70 having an overall length of approximately three to three-and-a-half inches (3.0-3.5 in.) and a nominal inside diameter of the sleeve central bore 74 in the range of three-quarter inch to one-and-a-half inches (0.75-1.5 in.), whether of constant diameter or stepped or tapered, though again, those skilled in the art will appreciate that other sizes and configurations and materials and methods of construction now known or later developed may be employed. It will be appreciated that in whatever size or configuration, the diameter of the sleeve central bore 74 particularly at its distal end 76 in the vicinity of the inner tapered surface 78 should approximate the diameter of the collet body 42 at its distal end 46 particularly in the vicinity of the outer tapered surface 48 so as to achieve the desired ramped engagement and selective compression of the collet 40 as described herein.

Figure 8:
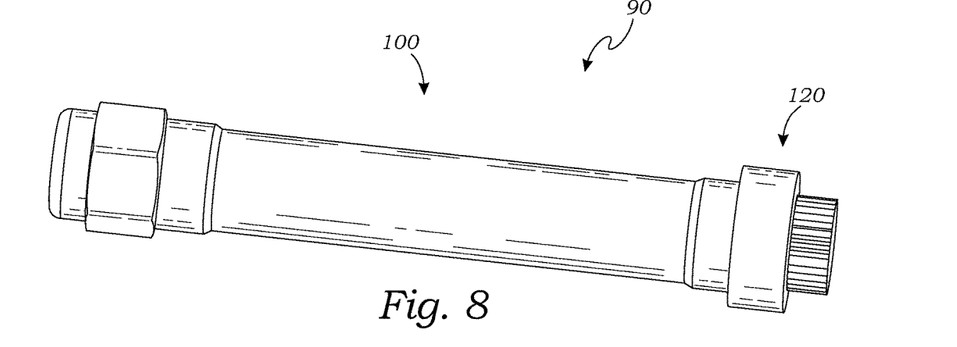
FIG. 8 is an enlarged perspective view of an exemplary driver of the wheel lock bolt removal tool of FIG. 2, in accordance with at least one embodiment.
Figure 9:
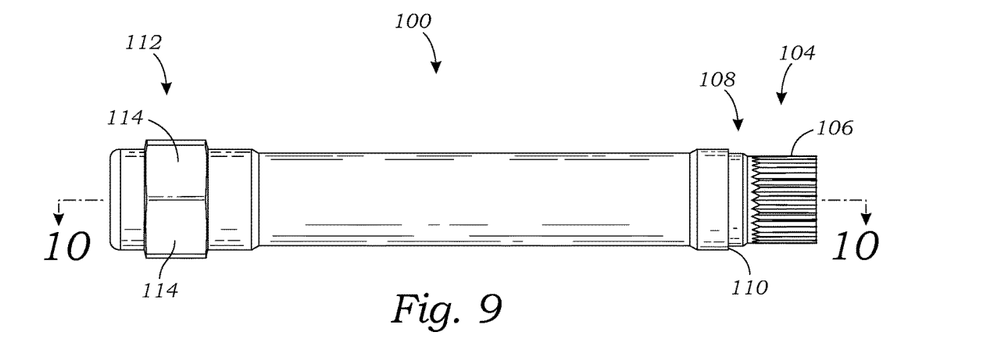
FIG. 9 is a side view of an exemplary driver shaft thereof, in accordance with at least one embodiment.
Figure 10:
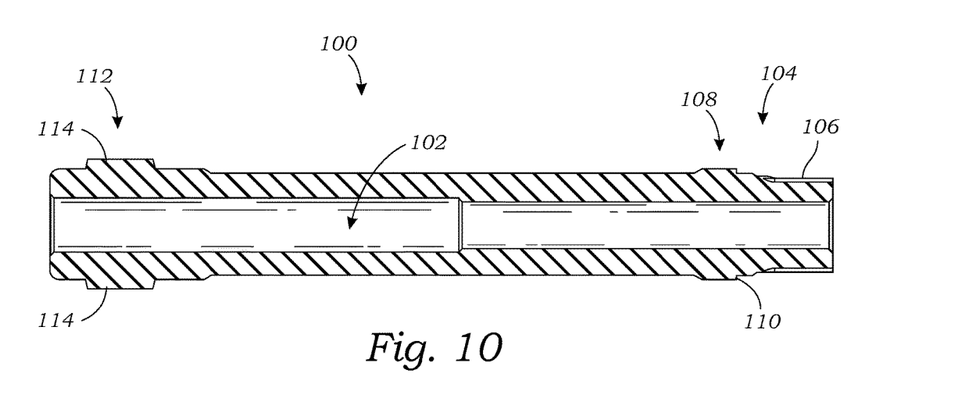
FIG. 10 is a cross-sectional view thereof taken along line 10-10 of FIG. 9, in accordance with at least one embodiment.

Referring briefly to FIG. 8, there is shown an enlarged perspective view of an exemplary driver 90 of the wheel lock bolt removal tool 20 according to aspects of the present invention such as shown in FIG. 2. The driver 90 itself is an assembly generally comprising a driver shaft 100 and a driver stop 120 received substantially coaxially over the driver shaft 100 at its distal end 104 adjacent to the male spline 106 (FIGS. 9 and 10). In the exemplary embodiment, the driver stop 120 is simply press fit onto the driver shaft 100, though it will be appreciated that other means of engagement and interoperability now known or later developed are possible without departing from the spirit and scope of the invention, including forming the driver stop 120 integral with the driver shaft 100 rather than as a separate component.

Figure 11:
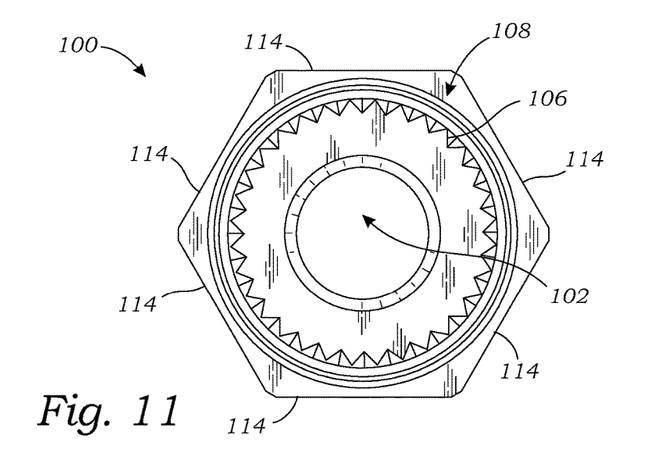
FIG. 11 is an enlarged end view thereof, in accordance with at least one embodiment.
Figure 12:
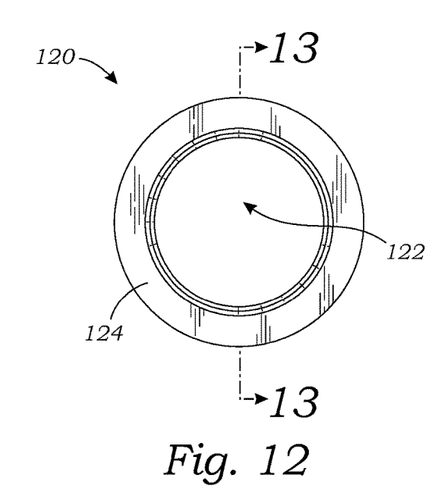
FIG. 12 is an enlarged end view of an exemplary driver stop of the driver of FIG. 8, in accordance with at least one embodiment.
Figure 13:
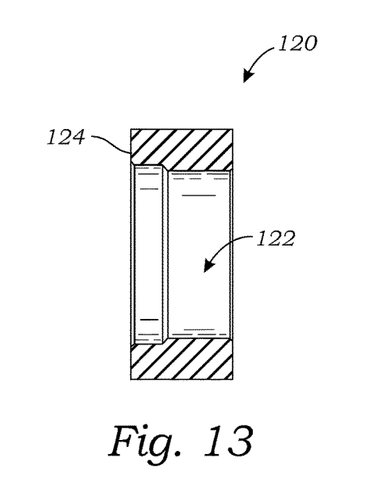
FIG. 13 is a cross-sectional view thereof taken along line 13-13 of FIG. 12, in accordance with at least one embodiment.

Turning to FIGS. 9 and 10, there are now shown side and cross-sectional views of an exemplary driver shaft 100 of the driver 90 of FIG. 8 as may be configured to axially receive the exemplary driver stop 120 of FIGS. 12 and 13. Here, the driver shaft 100 is shown as being formed having a central bore 102, though it will be appreciated that such bore 102 may not be included in some embodiments, more about which is said below, which central bore 102 may again be of constant diameter or stepped or tapered. At the distal end 104 of the driver shaft 100, as best appreciated with further reference to the enlarged end view of FIG. 11, there may be formed radially about the surface a lengthwise or axial male spline 106 sized and configured for selectively engaging the female spline F of the wheel lock bolt B (FIG. 1), the benefits in use of which will be appreciated from the below discussion. Notably, the pattern of the spline 106 as being machined or ground or otherwise formed in the distal end 104 of the driver shaft 100 terminates proximally in tapered grooves that transition to the surface of the shaft 100 distal of a distal collar 108. Accordingly, the individual grooves of the spline pattern 106 may not be of a constant depth, but may instead become shallower proximally. Those skilled in the art will appreciate that a constant height or depth engaging spline pattern, particularly at its proximal end, as may be formed in the wheel lock bolt B as defining its female spline F, would thus tend to have its proximal or opening edge bottom on the proximal end of the spline 106, potentially rendering the components inseparable or more difficult to separate after use. According to one aspect of the present invention, the resulting spline 106 is configured as having a substantially constant pattern or depth as by installing the driver stop 120 over the distal end 104 of the driver shaft 100 so as to be brought substantially adjacent to or butt up against the distally-facing shoulder 110 of the distal collar 108 formed on the shaft 100. Proximally, the driver shaft 100 is formed at its proximal end 112 having tool engagement surfaces 114 configured for engagement of the driver by a wrench or socket W (FIG. 16) or other tool during use, on which basis it will appreciated that such engagement surfaces 114 may be configured in a variety of ways to accommodate any such tool now known or later developed.

With reference to FIGS. 12 and 13, enlarged end and cross-sectional views of an exemplary driver stop 120 of the driver 90 of FIG. 8, the driver stop 120 is formed as an annular ring sized and configured to again be installed onto the distal end 104 of the driver shaft 100, with a proximally-facing surface 124 configured to substantially abut the distally-facing shoulder 110 of the distal collar 108 formed on the shaft 100. Notably, the driver stop 120 thus is to be formed having an internal bore 122 configured to have a net-fit or press-fit engagement with the outside surface of the driver shaft 100 distal of the distal collar 108, again whether the bore is substantially straight or tapered or stepped, such as to conform to the underlying outer surface of the driver shaft 100 on which the driver stop 120 is to seat, though it will be appreciated by those skilled in the art that any means of mounting the driver stop 120 on the driver shaft 100 now known or later developed may be employed according to aspects of the present invention without departing from its spirit and scope. Furthermore, the axial length of the driver stop 120 is to be such that upon seating on the distal end 104 of the shaft 100 as described the driver stop 120 overlies or covers the proximal portion of the spline 106, whereby the entire exposed portion of the spline 106 is substantially uniform in terms of the configuration and height or depth of the associated grooves forming the spline 106 for purposes of engagement with the female spline F of the wheel lock bolt B (FIG. 1). Those skilled in the art will again appreciate that such may be accomplished in numerous other ways now known or later developed, whether the driver 90 is of unitary construction or some assembly of two or more components. Accordingly, it will be appreciated that the particular configuration of the driver 90 and its components, namely, the driver shaft 100 and the driver stop 120 of FIGS. 9-13, are to be understood as merely illustrative of aspects of the present invention and non-limiting. Both the driver shaft 100 and the driver stop 120 may be formed of the same material, such as heat treated steel, or different materials, again whether unitary or assembled. In the exemplary embodiment, the resulting driver 90 of FIG. 8 is nominally four to five inches (4.0-5.0 in.) in length and approximately one-half to three-quarter inch (0.5-0.75 in.) in diameter, with the nominal central bore 102 being approximately one-quarter to one-half inch (0.25-0.5 in.), though again those skilled in the art will appreciate that other sizes and configurations and materials and methods of construction now known or later developed may be employed.

Fundamentally, while the driver 90 is configured with a male spline 106 for engaging the female spline F of the exposed wheel lock bolt B (FIG. 1), it will be appreciated that other tools and techniques may also be employed for engaging and removing the wheel lock bolt B once the spinning ring R is removed by the extractor 30 as herein described, such that even the driver 90 can be seen as optional.

Figure 14:
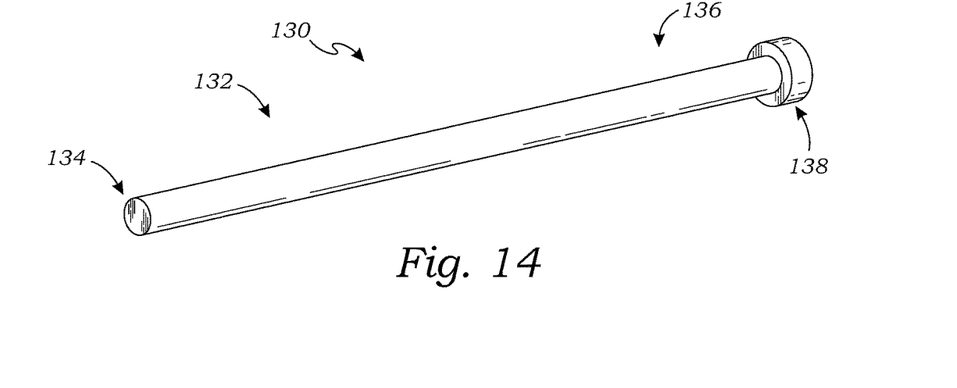
FIG. 14 is an enlarged perspective view of an exemplary pin of the wheel lock bolt removal tool of FIG. 2, in accordance with at least one embodiment.

Finally, turning briefly to FIG. 14, there is shown an enlarged perspective view of an exemplary pin 130 of the wheel lock bolt removal tool 20 of FIG. 2. The pin 130 generally comprises an elongate rod 132 having a blunt distal end 134 and formed at its proximal end 136 with a head 138. In the exemplary embodiment, the pin 130 is sized and configured so as to have an overall length longer than that of the driver shaft 100, or in the illustrated embodiment on the order of five to seven inches (5-7 in.) and an outside diameter of the rod 132 smaller than the central bore 102 of the driver shaft 100, which will be appreciated from the below discussion regarding use of the exemplary wheel lock bolt removal tool 20. Relatedly, the outside diameter of the rod 132 should also be smaller than the diameter of the cross-hole 62 formed in the collet body 42 (FIGS. 4 and 5) for purposes of selectively passing the rod 132 of the pin 130 through the cross-hole 62 for aid in holding the collet 40 as the sleeve 70 is rotated relative to the collet 40. The pin 130 may be formed with the rod 132 and head 138 integral or as separate components later assembled and of any suitable material, including steel. Once more, those skilled in the art will appreciate that a variety of other sizes and configurations and materials and methods of construction now known or later developed may be employed for the pin 130 or any other components of the illustrated wheel lock bolt removal tool 20. By way of illustration, the pin 130 may instead be incorporated into or be integral with the extractor 30 or the extractor 30, and the collet 40 particularly, may otherwise be equipped with a means for grasping and a degree of leverage such that pin 130 can be seen as fundamentally optional.

Figures 15, 16:
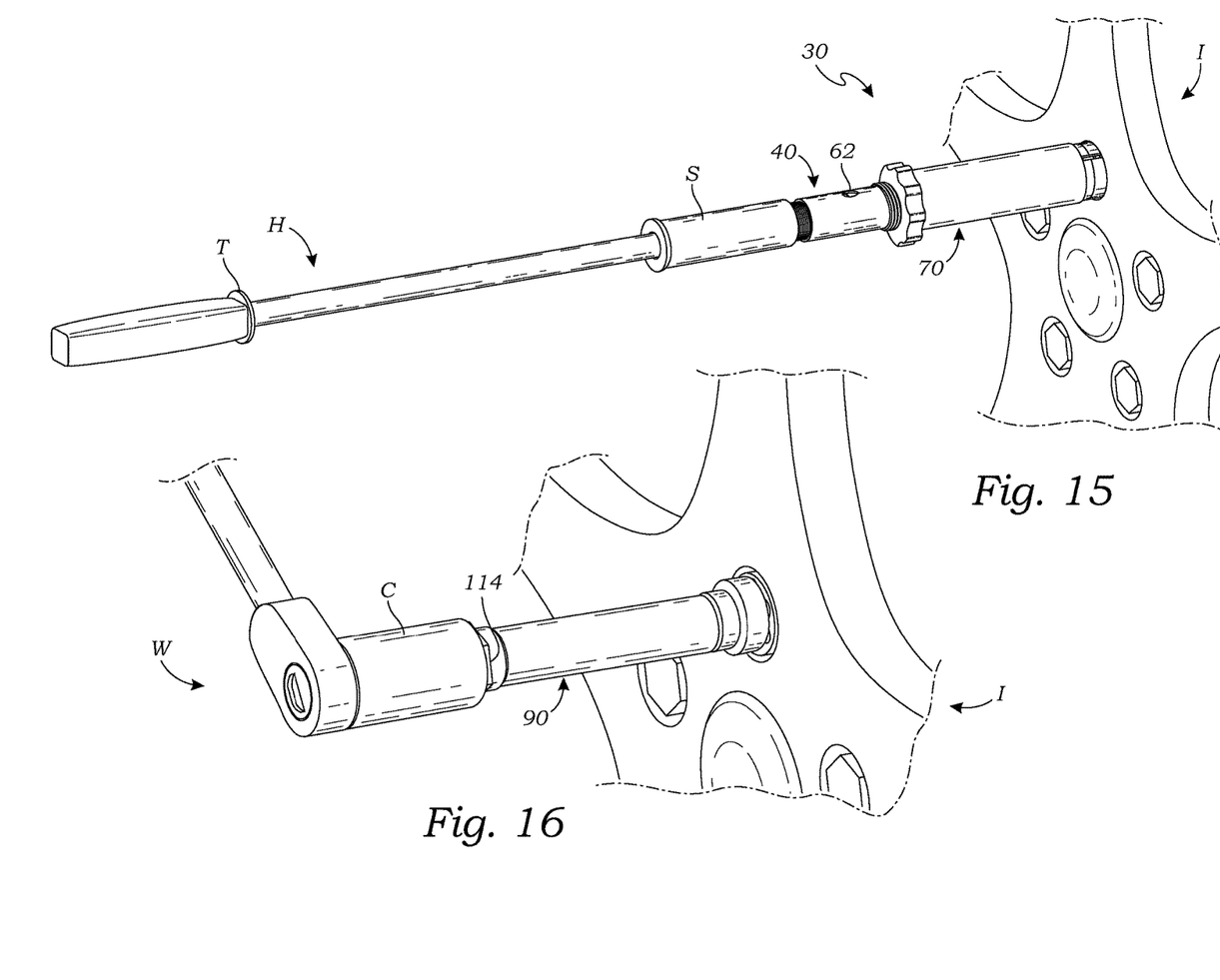
FIG. 15 is a reduced scale perspective view of an exemplary extractor as in FIGS. 3-7 of an exemplary wheel lock bolt removal tool as in FIG. 2 in use, in accordance with at least one embodiment.
FIG. 16 is a reduced scale perspective view of an exemplary driver as in FIGS. 8-13 of an exemplary wheel lock bolt removal tool as in FIG. 2 in use, in accordance with at least one embodiment.

In use, referring now to FIGS. 15 and 16, removal of a stuck wheel lock W (FIG. 1) is accomplished relatively quickly and easily when employing a wheel lock bolt removal tool 20 according to aspects of the present invention as herein shown and described. An exemplary methodology is now described, though it will be appreciated that some steps may be combined or skipped or the order thereof reversed or changed. The first step is typically to engage the pin 130 (FIG. 14) with the collet 40 of the extractor 30 as by inserting the rod 132 of the pin 130, distal end 134 first, into the cross-hole 62 formed in the proximal end 56 of the collet body 42 (FIGS. 4 and 5) until the head 138 of the pin 130 abuts the collet body 42, the pin 130 thus serving as a handle for the collet 40 during use. Next, the extractor 30 is positioned onto the wheel lock W that is to be removed as by placing the collet distal end 46 over the wheel lock bolt B, and particularly by positioning the wheel lock spinning ring R within the distal opening 50 of the collet body 42, preferably such that the collet body 42 is shifted distally until it bottoms on the wheel I surrounding the head of the wheel lock bolt B such that the radially-inwardly-projecting distal lip 52 of the collet body 42 is positioned substantially at the back edge E of the ring R. Then, while holding the extractor 30 in this position as by grasping the collet 40 and inserted pin 130 with one hand, the other hand is used to rotate the sleeve 70 of the extractor 30 relative to the collet 40, as by grasping the knob 82, so as to shift the sleeve 70 distally and thereby squeeze the distal end 46 of the collet body 42 as above-described and thereby tighten and clamp the collet body 42 around and onto the ring R, with the distal lip 52 then being seated behind and adjacent to the distal edge E of the ring R. Hand-tightening the sleeve 70 using the proximal knob 82 formed thereon until no slop or movement is felt between the collet 40 and wheel lock spinning ring R is sufficient. The pin 130 can then be removed from the collet 40 and set aside. Assuming the wheel lock W to be removed is on a wheel I of a vehicle (not shown), it is best to position the wheel lock W at top dead center or the twelve o-clock position before lowering the vehicle so that its weight is no longer supported by the lift, though this is not required; obviously, if there is no vehicle lift available or the vehicle is otherwise already on the ground supporting its own weight, then the wheel lock W can be accessed and removed in whatever position it is in. Then, as shown in FIG. 15, a slide hammer H with a ⅝-18 male thread adapter is screwed into the proximal end 56 of the collet body 42 as by engaging the female inner threads 60 thereof, being careful to at all times support the weight of the slide hammer H and keep the slide hammer H substantially horizontal or in-line with the extractor 30 and the wheel lock W. The slide hammer H and its threaded adapter should continue to be turned and inserted until it is visible in the cross-hole 62 of the collet body 42, ensuring sufficient thread engagement. Next, while continuing to support the weight of the slide hammer with one hand as by grasping the slide D and simultaneously grasping the extractor 30 with the other hand, the slide D of the slide hammer H may be operated in an axial direction away from the extractor 30 in the customary manner, whereby repeated blows of the slide D against the rear or proximal stop T of the slide hammer H serves to shift the slide hammer H and extractor 30 proximally or away from the wheel lock W, thereby pulling the ring R and pad P of the wheel lock W off of the wheel lock bolt B that remains for the moment in the wheel I of the vehicle, as again by disengaging the male spline M of the wheel lock pad P from the female spline F of the wheel lock bolt B. With reference then to FIG. 16, the exposed wheel lock bolt B, and particularly its female spline F, can then be engaged by the driver 90 (FIGS. 8-13) of the wheel lock bolt removal tool 20 as by inserting the distal end 104 of the driver shaft 100 having formed thereon the male spline 106 into the exposed female spline F of the wheel lock bolt B. Such insertion may require alignment of the respective splines 106, F and then driving the driver shaft 100 into the wheel lock bolt B to engage the splines 106, F by striking the proximal end 112 of the driver shaft 100 with a brass or plastic hammer or mallet (not shown). Once the driver 90 is fully seated and positively engaged with the wheel lock bolt B, a 17 mm socket C of a breaker bar or socket wrench W or other such tool may be engaged with the tool engagement surfaces 114 at the proximal end 112 of the driver shaft 100 of the driver 90 and the driver 90 rotated to loosen or break free the wheel lock bolt B and allow it to be removed. The wheel lock bolt B may then remain stuck in the driver 90 due to the engagement of the male spline 106 of the driver shaft 100 with the female spline F of the bolt B—to remove the bolt B from the driver 90 the blunt distal end 134 of the pin 130 may simply be inserted through the central bore 102 of the driver shaft 100 until it contacts the bolt B and then the head 138 of the pin 130 may be struck by a hammer or mallet until the bolt B is knocked free of the driver 90 and so the driver 90 is ready to be used again. Similarly, the spinning ring R and pad P of the removed wheel lock W that may still be lodged or clamped within the extractor 30 are dislodged and removed by simply loosening the sleeve 70 relative to the collet 40, or by turning the sleeve 70 oppositely so as to shift it proximally, thereby allowing the distal end 46 of the collet body 42 to expand again, enlarging the distal opening 50 and allowing the ring R and pad P to fall free of the extractor 30. If not already, the slide hammer is to be unthreaded from the collet body 42 as well, which is then readied for further use also. Once more, those skilled in the art will appreciate that other steps and other similar repair jobs may be performed according to aspects of the present wheel lock bolt removal tool invention without departing from its spirit and scope, such that the exemplary tool and related method of use are to be understood as merely illustrative and non-limiting.

Aspects of the present specification may also be described as follows:

1. A wheel lock bolt removal tool apparatus for removing a wheel lock from a vehicle wheel, the wheel lock having a wheel lock bolt with a spinning ring retained thereon by a pad, the apparatus comprising: an extractor comprising a collet and a sleeve received substantially coaxially over the collet, the collet having a collet body formed with a distal outer tapered surface and the sleeve having a sleeve body with a distal inner tapered surface formed within a sleeve central bore and configured to selectively engage the distal outer tapered surface of the collet when the sleeve is received thereover as by passing the collet body into the sleeve central bore, the collet body having a distal opening at a distal end thereof formed having a radially-inwardly-projecting distal lip, the distal opening and distal lip configured to pass over and seat on the spinning ring of the wheel lock as by engaging the lip on a distal edge of the spinning ring, the collet body configured to be selectively closed upon distal movement of the sleeve along the collet and further having a proximal end configured for application of an axial proximally-directed force; wherein: shifting the sleeve distally relative to the collet selectively engages the distal outer tapered surface of the collet with the distal inner tapered surface of the sleeve thereby creating a mechanical ramp effect and causing the distal end of the collet body to be radially compressed, reducing the size of the distal opening and clamping the extractor onto the spinning ring with the radially-inwardly-projecting lip seating distally behind the distal edge of the spinning ring, whereby application of an axial proximally-directed force to the proximal end of the collet body serves to remove the spinning ring and the pad from the wheel lock bolt.

2. The apparatus of embodiment 1 wherein: the collet body is formed with outer threads; and the sleeve body is formed with inner threads configured to threadably engage the outer threads when the sleeve is received over the collet, whereby rotation of the sleeve relative to the collet selectively shifts the sleeve distally to further engage the distal outer tapered surface of the collet with the distal inner tapered surface of the sleeve and cause the distal end of the collet body to be radially compressed and thereby clamp the extractor onto the spinning ring.

3. The apparatus of embodiment 2 wherein the outer threads are formed on the collet body intermediate the proximal and distal ends thereof.

4. The apparatus of any of embodiments 1-3 wherein the collet body is further formed having a cross-hole substantially at the proximal end thereof.

5. The apparatus of embodiment 4 further comprising a pin having a rod and a head formed at the proximal end thereof, the rod configured to pass through the cross-hole from a distal end thereof and the head configured to abut the collet body about the cross-hole, whereby the pin forms a temporary handle for the collet during use.

6. The apparatus of embodiment 4 or embodiment 5 wherein the collet body is further formed having a central bore in communication between the proximal and distal ends of the collet body, the central bore further in communication with the cross-hole.

7. The apparatus of embodiment 6 wherein the central bore is formed having inner threads substantially at the proximal end of the collet body, the inner threads configured for threadable receipt of a slide hammer in applying the axial proximally-directed force to the proximal end of the collet body.

8. The apparatus of embodiment 7 wherein the inner threads intersect the cross-hole, whereby engagement of the slide hammer with the inner threads can be visualized through the cross-hole.

9. The apparatus of any of embodiments 6-8 wherein the collet body is further formed having two or more spaced apart lengthwise slots communicating with the central bore and allowing the distal end of the collet body to flex inwardly and thus the distal opening to close in response to distal movement of the sleeve relative to the collet.

10. The apparatus of embodiment 9 wherein the slots are formed distally of the outer threads.

11. The apparatus of any of embodiments 2-10 wherein the sleeve body is formed at the proximal end thereof having a knob for grasping during use to facilitate rotation of the sleeve relative to the collet.

12. The apparatus of any of embodiments 1-11 further comprising a driver comprising a driver shaft having a distal end and a driver stop having an internal bore received substantially coaxially over the distal end of the driver shaft.

13. The apparatus of embodiment 12 wherein a male spline is formed on the distal end of the driver shaft distal of a distal collar, the male spline configured for selective engagement with a female spline of the wheel lock bolt accessible when the spinning ring and the pad are removed from the wheel lock bolt.

14. The apparatus of embodiment 13 wherein a proximally-facing surface of the driver stop abuts a distally-facing shoulder of the distal collar, the driver stop configured to thereby cover a portion of the male spline, the remainder of the male spline being exposed and substantially uniform.

15. The apparatus of embodiment 13 or embodiment 14 wherein the driver shaft is further formed at a proximal end thereof having a plurality of tool engagement surfaces, whereby the driver may be selectively engaged by a tool via the tool engagement surfaces for the purpose of rotating the driver and the wheel lock bolt engaged with the driver as through engagement of the male spline with a corresponding female spline of the wheel lock bolt.

16. The apparatus of embodiment 15 wherein the driver shaft is further formed having a central bore in communication between the proximal and distal ends of the driver shaft, whereby a pin may be driven through the central bore to remove the wheel lock bolt from the driver as by disengaging the female spline from the male spline.

17. A method of employing a wheel lock bolt removal tool apparatus as defined in any one of embodiments 1-16, the method comprising the steps of: positioning the extractor on the wheel lock that is to be removed as by placing the collet distal end over the wheel lock bolt such that the wheel lock spinning ring is positioned within the distal opening of the collet body with the radially-inwardly-projecting distal lip of the collet body positioned substantially at the back edge of the spinning ring; and shifting the sleeve distally to thereby squeeze the distal end of the collet body and thereby tighten and clamp the collet body around and onto the spinning ring, with the distal lip then being seated behind and adjacent to the distal edge of the spinning ring.

18. The method of embodiment 17, wherein the step of positioning the extractor further comprises engaging the pin with the collet as by inserting the rod of the pin, distal end first, into the cross-hole formed in the proximal end of the collet body until the head of the pin abuts the collet body, the pin thus serving as a handle for the collet during use.

19. The method of embodiment 17 or embodiment 18, wherein the step of shifting the sleeve comprises rotating the sleeve relative to the collet.

20. The method of embodiment 19, wherein the step of shifting the sleeve as by rotating the sleeve further comprises grasping and turning the knob formed on the sleeve body.

21. The method of any of embodiments 17-20, further comprising the step of threadably engaging a slide hammer with the female inner threads formed in the proximal end of the collet body.

22. The method of embodiment 21, wherein the step of threadably engaging the slide hammer with the collet body further comprises continued turning of the slide hammer relative to the collet body until a portion of the slide hammer is visible in the cross-hole of the collet body.

23. The method of embodiment 21 or embodiment 22, further comprising the step of abruptly sliding the slide of the slide hammer proximally against the stop thereof, repeating as necessary until the spinning ring and the pad are removed from the wheel lock bolt as by disengaging a male spline of the wheel lock pad from the female spline of the wheel lock bolt.

24. The method of any of embodiments 17-23, further comprising the step of removing the removed spinning ring and pad from the extractor by shifting the sleeve proximally, thereby allowing the distal end of the collet body to expand, enlarging the distal opening and allowing the spinning ring and the pad to be removed from the extractor.

25. The method of embodiment 24, wherein the step of removing the removed spinning ring and pad from the extractor as by shifting the sleeve proximally further comprises rotating the sleeve oppositely relative to the collet.

26. The method of any of embodiments 17-24, further comprising the step of engaging the driver with the wheel lock bolt as by inserting the distal end of the driver shaft having formed thereon the male spline into the exposed female spline of the wheel lock bolt.

27. The method of embodiment 26, wherein the step of engaging the driver with the wheel lock bolt comprises the further steps of aligning the respective male and female splines and then driving the driver shaft into the wheel lock bolt to engage the splines by striking the proximal end of the driver shaft.

28. The method of embodiment 26 or embodiment 27, further comprising the steps of engaging the tool engagement surfaces at the proximal end of the driver shaft with a tool and rotating the tool to loosen the wheel lock bolt and allow it to be removed from the vehicle wheel.

29. The method of embodiment 28, further comprising the step of removing the removed wheel lock bolt from the driver by inserting the blunt distal end of the pin through the central bore of the driver shaft until it contacts the wheel lock bolt and then striking the head of the pin until the wheel lock bolt is knocked free of the driver as by disengaging the female spline of the wheel lock bolt from the male spline of the driver shaft.

30. A kit comprising a wheel lock bolt removal tool apparatus as defined in any one of embodiments 1-16.

31. The kit of embodiment 30, further comprising a case having recesses for one or more of the extractor, the driver, and the pin.

32. The kit of embodiment 30 or embodiment 31, further comprising instructional material.

33. The kit of embodiment 32, wherein the instructional material provides instructions on how to perform the method as defined in any one of embodiments 17-29.

34. Use of a wheel lock bolt removal tool apparatus as defined in any one of embodiments 1-16 to remove a wheel lock from a vehicle wheel.

35. The use of embodiment 34, wherein the use comprises a method as defined in any one of embodiments 17-29.

In closing, regarding the exemplary embodiments of the present invention as shown and described herein, it will be appreciated that a wheel lock bolt removal tool is disclosed and configured for removing a high-security wheel lock bolt with spinning ring from a vehicle wheel. Because the principles of the invention may be practiced in a number of configurations beyond those shown and described, it is to be understood that the invention is not in any way limited by the exemplary embodiments, but is able to take numerous forms without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.— for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with any appended claims here or in any patent application claiming the benefit hereof, and it is made clear that the inventor believes that the claimed subject matter is the invention.

What is claimed is:

1. A wheel lock bolt removal tool apparatus for non-damaging removal of a wheel lock from a vehicle wheel, the wheel lock having a wheel lock bolt with a spinning ring retained thereon by a pad, the apparatus comprising:
    an extractor comprising a collet and a sleeve received substantially coaxially over the collet, the collet having a collet body formed with a distal outer tapered surface and the sleeve having a sleeve body with a distal inner tapered surface formed within a sleeve central bore and configured to selectively engage the distal outer tapered surface of the collet when the sleeve is received thereover as by passing the collet body into the sleeve central bore, the collet body having a distal opening at a distal end thereof formed having a radially-inwardly-projecting distal lip, the distal opening and distal lip configured to pass over and seat on the spinning ring of the wheel lock as by engaging the lip on a distal edge of the spinning ring, the collet body configured to be selectively closed upon distal movement of the sleeve along the collet and further having a proximal end configured for application of an axial proximally-directed force; and
    a driver comprising a driver shaft having a distal end, the driver configured to axially engage the wheel lock bolt once the spinning ring and the pad are removed therefrom; wherein:
    shifting the sleeve distally relative to the collet selectively engages the distal outer tapered surface of the collet with the distal inner tapered surface of the sleeve thereby creating a mechanical ramp effect and causing the distal end of the collet body to be radially compressed, reducing the size of the distal opening and clamping the extractor onto the spinning ring with the radially-inwardly-projecting lip seating distally behind the distal edge of the spinning ring, whereby application of an axial proximally-directed force to the proximal end of the collet body serves to non-destructively remove the spinning ring and the pad from the wheel lock bolt without substantial contact or damage to the vehicle wheel; and
    axially engaging the distal end of the driver with the wheel lock bolt upon removal of the spinning ring and the pad enables rotation of the wheel lock bolt as a rotational force is applied to the driver, whereby application of a rotational force to the driver serves to remove the wheel lock bolt from the vehicle wheel again without substantial contact or damage to the vehicle wheel.

2. The apparatus of claim 1 wherein a male spline is formed on the distal end of the driver shaft distal of a distal collar, the male spline configured for selective engagement with a female spline of the wheel lock bolt accessible when the spinning ring and the pad are removed from the wheel lock bolt.

3. The apparatus of claim 2 wherein the driver further comprises a separate driver stop having an internal bore received substantially coaxially over the distal end of the driver shaft.

4. The apparatus of claim 3 wherein a proximally-facing surface of the driver stop abuts a distally-facing shoulder of the distal collar, the driver stop configured to thereby cover a portion of the male spline, the remainder of the male spline being exposed and substantially uniform.

5. The apparatus of claim 2 wherein the driver shaft is further formed at a proximal end thereof having a plurality of tool engagement surfaces, whereby the driver may be selectively engaged by a tool via the tool engagement surfaces for the purpose of rotating the driver and the wheel lock bolt engaged with the driver as through engagement of the male spline with a corresponding female spline of the wheel lock bolt.

6. The apparatus of claim 5 wherein the driver shaft is further formed having a central bore in communication between the proximal and distal ends of the driver shaft, whereby a pin may be driven through the central bore to remove the wheel lock bolt from the driver as by disengaging the female spline from the male spline.

7. The apparatus of claim 1 wherein:
the collet body is formed with outer threads; and
the sleeve body is formed with inner threads configured to threadably engage the outer threads when the sleeve is received over the collet, whereby rotation of the sleeve relative to the collet selectively shifts the sleeve distally to further engage the distal outer tapered surface of the collet with the distal inner tapered surface of the sleeve and cause the distal end of the collet body to be radially compressed and thereby clamp the extractor onto the spinning ring.

8. The apparatus of claim 7 wherein the sleeve body is formed at the proximal end thereof having a knob for grasping during use to facilitate rotation of the sleeve relative to the collet.

9. The apparatus of claim 7 wherein the outer threads are formed on the collet body intermediate the proximal and distal ends thereof.

10. The apparatus of claim 9 wherein the collet body is further formed having a cross-hole substantially at the proximal end thereof, proximal of the outer threads.

11. The apparatus of claim 10 further comprising a pin having a rod and a head formed at a proximal end thereof, the rod configured to pass through the cross-hole from a distal end thereof and the head configured to abut the collet body about the cross-hole, whereby the pin forms a temporary handle for the collet during use.

12. The apparatus of claim 10 wherein the collet body is further formed having a central bore in communication between the proximal and distal ends of the collet body, the central bore further in communication with the cross-hole.

13. The apparatus of claim 12 wherein the central bore is formed having inner threads substantially at the proximal end of the collet body, the inner threads configured for threadable receipt of a slide hammer in applying the axial proximally-directed force to the proximal end of the collet body.

14. The apparatus of claim 13 wherein the inner threads intersect the cross-hole, whereby engagement of the slide hammer with the inner threads can be visualized through the cross-hole.

15. The apparatus of claim 12 wherein the collet body is further formed having two or more spaced apart lengthwise slots communicating with the central bore and allowing the distal end of the collet body to flex inwardly and thus the distal opening to close in response to distal movement of the sleeve relative to the collet.

16. The apparatus of claim 15 wherein the slots are formed distally of the outer threads.

17. A method of employing a wheel lock bolt removal tool apparatus to remove a wheel lock from a vehicle wheel without substantial contact or damage to the vehicle wheel, the wheel lock having a wheel lock bolt with a spinning ring retained thereon by a pad, comprising the steps of: positioning an extractor comprising a collet and a sleeve received substantially coaxially over the collet on the wheel lock that is to be removed as by placing a distal end of a collet body of the collet over the wheel lock bolt such that the spinning ring is positioned within a distal opening at the distal end of the collet body, with a radially-inwardly-projecting distal lip of the collet body positioned substantially at a back edge of the spinning ring; shifting the sleeve distally to engage a distal inner tapered surface formed within a sleeve central bore of a sleeve body thereof with a distal outer tapered surface of the collet body to thereby squeeze the distal end of the collet body and reduce the distal opening and tighten and clamp the collet body onto the spinning ring, with the distal lip then being seated behind and adjacent to a distal edge of the spinning ring; threadably engaging a slide hammer with inner threads formed in a proximal end of the collet body, the collet body configured to be selectively closed upon distal movement of the sleeve along the collet and to then receive an axial proximally-directed force; and abruptly sliding a slide of the slide hammer proximally against a stop thereof, repeating as necessary until the spinning ring and the pad are non-destructively removed from the wheel lock bolt as by disengaging a male spline of the wheel lock pad from a female spline of the wheel lock bolt to expose the female spline, whereby the exposed female spline of the wheel lock bolt may be engaged to then remove the wheel lock bolt from the vehicle wheel.

18. The method of claim 17, wherein the step of positioning an extractor further comprises engaging a pin with the collet as by inserting a rod of the pin, distal end first, into a cross-hole formed in the proximal end of the collet body until a head of the pin abuts the collet body, the pin thus serving as a handle for the collet during use.

19. The method of claim 17, further comprising the step of engaging a driver comprising a driver shaft with the wheel lock bolt as by inserting a distal end of the driver shaft having formed thereon a male spline into the exposed female spline of the wheel lock bolt.

20. The method of claim 19, further comprising the steps of engaging tool engagement surfaces formed at a proximal end of the driver shaft with a tool and rotating the tool and thus the driver shaft to loosen the wheel lock bolt and allow it to be removed from the vehicle wheel.

21. A wheel lock bolt removal tool apparatus for removing a wheel lock from a vehicle wheel, the wheel lock having a wheel lock bolt with a spinning ring retained thereon by a pad, the apparatus comprising: a driver comprising a driver shaft having a distal end and a distal collar formed thereon, the driver further comprising a separate driver stop having an internal bore received substantially coaxially over the distal end of the driver shaft so as to be substantially adjacent to the distal collar; wherein: a male spline is formed on the distal end of the driver shaft distal of the distal collar, the male spline configured for selective engagement with a female spline of the wheel lock bolt accessible when the spinning ring and the pad are removed from the wheel lock bolt; and a proximally-facing surface of the driver stop abuts a distally-facing shoulder of the distal collar, the driver stop configured to thereby cover a portion of the male spline, the remainder of the male spline being exposed and substantially uniform; whereby, upon removal of the spinning ring and the pad from the wheel lock bolt, axially engaging the male spline formed on the distal end of the driver with the female spline of the wheel lock bolt until the driver stop is substantially adjacent to the wheel lock bolt enables rotation of the wheel lock bolt as a rotational force is applied to the driver, application of the rotational force to the driver serving to remove the wheel lock bolt from the vehicle wheel without substantial contact or damage to the vehicle wheel, and further enables subsequent removal of the wheel lock bolt from the driver since the male spline pattern is partially covered by the driver stop and thus does not bottom in the female spline of the wheel lock bolt.

* * * * *